United States Patent
Xu et al.

(10) Patent No.: US 11,029,165 B2
(45) Date of Patent: Jun. 8, 2021

(54) SENSOR INTEGRATION AND SYNCHRONIZATION UNIT FOR AN AUTONOMOUS DRIVING VEHICLE

(71) Applicant: Baidu USA LLC, Sunnyvale, CA (US)

(72) Inventors: Zhou Xu, Sunnyvale, CA (US); Manjiang Zhang, Sunnyvale, CA (US); Xiangtao You, Sunnyvale, CA (US); Weiyu Lu, Sunnyvale, CA (US); Fu-Kang Liao, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 98 days.

(21) Appl. No.: 16/158,287

(22) Filed: Oct. 11, 2018

(65) Prior Publication Data

US 2020/0116502 A1    Apr. 16, 2020

(51) Int. Cl.
| | | |
|---|---|---|
| *G01C 21/34* | (2006.01) | |
| *G05D 1/02* | (2020.01) | |
| *G01C 21/36* | (2006.01) | |
| *G01S 19/46* | (2010.01) | |
| *G01S 17/931* | (2020.01) | |

(52) U.S. Cl.
CPC ......... *G01C 21/343* (2013.01); *G01C 21/362* (2013.01); *G01C 21/3623* (2013.01); *G01S 17/931* (2020.01); *G01S 19/46* (2013.01); *G05D 1/0257* (2013.01); *G05D 1/0278* (2013.01)

(58) Field of Classification Search
CPC .......... G01C 21/343; G01C 21/3623; G01C 21/362; G01C 21/3407; G01C 21/26; G01S 17/931; G01S 19/46; G05D 1/0278; G05D 1/0257
USPC ....................................................... 701/533
See application file for complete search history.

(56) References Cited

U.S. PATENT DOCUMENTS

2019/0120946 A1* 4/2019 Wheeler ............... G01S 17/89

* cited by examiner

*Primary Examiner* — Maceeh Anwari
(74) *Attorney, Agent, or Firm* — Womble Bond Dickinson (US) LLP

(57) ABSTRACT

A sensor unit includes a sensor interface and a host interface. The sensor interface can be coupled to a number of sensors mounted on various locations of the ADV. The host interface can be coupled to a host system that is configured to perceive a driving environment surrounding the ADV based on sensor data obtained from the sensors and to plan a path to autonomously drive the ADV. The sensor unit further includes a sensor processing module and a sensor control module coupled to the sensor interface, and a time module coupled to the sensor processing module and the sensor control module. The sensor processing module is configured to process sensor data received from the sensors via the sensor interface. The sensor control module is configured to control operations of the sensors. The time module is configured to generate time to synchronize timing of the operations of the sensors.

20 Claims, 12 Drawing Sheets

US 11,029,165 B2

SENSOR INTEGRATION AND SYNCHRONIZATION UNIT FOR AN AUTONOMOUS DRIVING VEHICLE

TECHNICAL FIELD

Embodiments of the present disclosure relate generally to operating autonomous vehicles. More particularly, embodiments of the disclosure relate to a sensor system of an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control depends heavily on the sensors of the vehicle. Different sensors may have different requirements or specifications. Typically, an autonomous vehicle has a centralized computing chassis that connects to all sensors and actuators on a car. The maximum number of sensors and connector allowed is predetermined by the number of I/O ports of a centralized computer. Further, the connected sensors, including LiDAR and cameras, are not synchronized. This can create ghost objects. In other words, an object can show up at one location from LiDAR's data but show up at a different location from camera's data, because LiDAR and cameras are not synchronized. Given the limited resources on the hardware, there has been a lack of efficient sensor processing units that can process different types of sensors efficiently.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
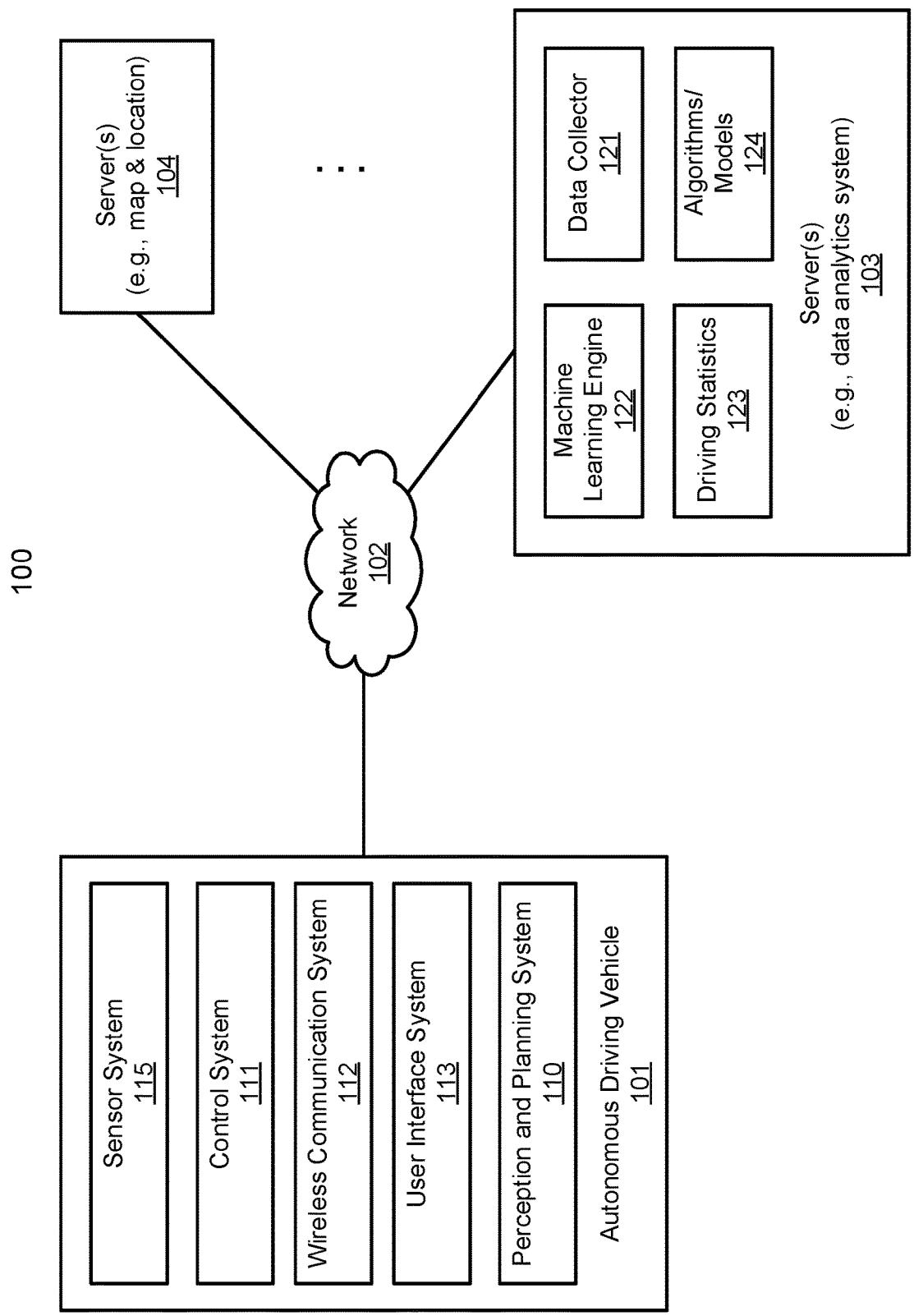
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Accordingly, embodiments of the invention are designed to solve the problems described above. By connecting a sensor unit to a computer, the I/O capability greatly expands. If one needs even more I/O, two sensor units can be utilized. The sensor unit can collect sensor data, enable synchronization and then pass the data to the connected computer. A sensor unit is designed to work with Industrial PC (IPC) to implement sensor fusion, vehicle control and network access in an autonomous driving platform. The sensor unit provides sensor interfaces to collect data from various sensors, including cameras, radars, and ultrasonic sensors. The sensor unit also utilizes pulse per second (PPS) and GPRMC signals from GNSS receiver to enable synchronization for the camera and LiDAR sensors. The communication between the ASU and the IPC is through a PCI Express interface (PCIe). The sensor unit collects sensor data and passes to IPC via the PCIe interface, and the IPC uses the sensor unit to send out vehicle control commands in the controller area network (CAN) protocol.

According to one aspect of the invention, a sensor unit to be utilized in an autonomous driving vehicle (ADV) includes a sensor interface and a host interface. The sensor interface can be coupled to a number of sensors mounted on various locations of the ADV. The host interface can be coupled to a host system that is configured to perceive a driving environment surrounding the ADV based on sensor data obtained from the sensors and to plan a path to autonomously drive the ADV. The sensor unit further includes a sensor processing module and a sensor control module coupled to the sensor interface, and a time module coupled to the sensor processing module and the sensor control module. The sensor processing module is configured to process sensor data received from the sensors via the sensor interface. The sensor control module is configured to control operations of the sensors. The time module is configured to generate time to synchronize timing of the operations of the sensors.

In one embodiment, in order to access any of the sensors, the host system has to go through the sensor unit. The time module is configured to generate timestamps for the sensor processing module and the sensor control module, referred to as receiving timestamps and transmitting timestamps. The receiving timestamps are utilized by the sensor processing module to process the sensor data received from the sensors in a controlled timing manner. Similarly, the transmitting timestamps are utilized by the sensor control module to control the sensors in a controlled timing manner. The time module is configured generate time based on GPS signals received from a GPS sensor or pulse per second (PPS) and GPRMC signals received from a GNSS received via the sensor interface. When the GPS or the PPSGPRMC signals are unavailable, the time module is configured to derive time from other time sources (e.g., host system or a remote device over a network).

In one embodiment, the sensor unit further includes one or more data transfer modules to transfer the data processed by the sensor processing module to the host system over the host interface. The data transfer module can operate in various operating modes, including a low latency mode, a high bandwidth mode, and a fixed memory mode. When operating in a low latency mode, the data transfer module is configured to transfer data with no delay or minimum delay. When operating in a high bandwidth mode, a data transfer module is configured to accumulate the data up to a predetermined amount before sending the accumulated data in a batch to the host system to maximize the bandwidth of the connection between the sensor unit and the host system, similar to a burst mode. The amount of accumulated data is subject to the available bandwidth of the connection that can be transferred within a single transfer cycle or a minimum number of transfer cycles. For example, if the connection is a peripheral component interconnect (PCI) express (PCIe) link, the amount of accumulated data is up to the amount that the PCIe link can handle within a single PCI cycle or a limited number of PCI cycles. In another embodiment, a data transfer module can be configured to operate in a memory mode (also referred to as a fixed memory mode), which directly accesses a mapped memory that is mapped from a system memory of the host system.

According to another aspect, an autonomous driving system includes a number of sensors mounted on different locations of an ADV and a host system. The host system includes a perception module and a planning and control module. The perception module is configured to perceive a driving environment surrounding the ADV based on sensor data obtained from the sensors. The planning and control module is to plan a path to autonomously drive the ADV based on perception data. The autonomous driving system further includes a sensor unit coupled to the sensors and the host system. The sensor unit includes a sensor interface and a host interface. The sensor interface can be coupled to a number of sensors mounted on various locations of the ADV. The host interface can be coupled to a host system that is configured to perceive a driving environment surrounding the ADV based on sensor data obtained from the sensors and to plan a path to autonomously drive the ADV. The sensor unit further includes a sensor processing module and a sensor control module coupled to the sensor interface, and a time module coupled to the sensor processing module and the sensor control module. The sensor processing module is configured to process sensor data received from the sensors via the sensor interface. The sensor control module is configured to control operations of the sensors. The time module is configured to generate time to synchronize timing of the operations of the sensors.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
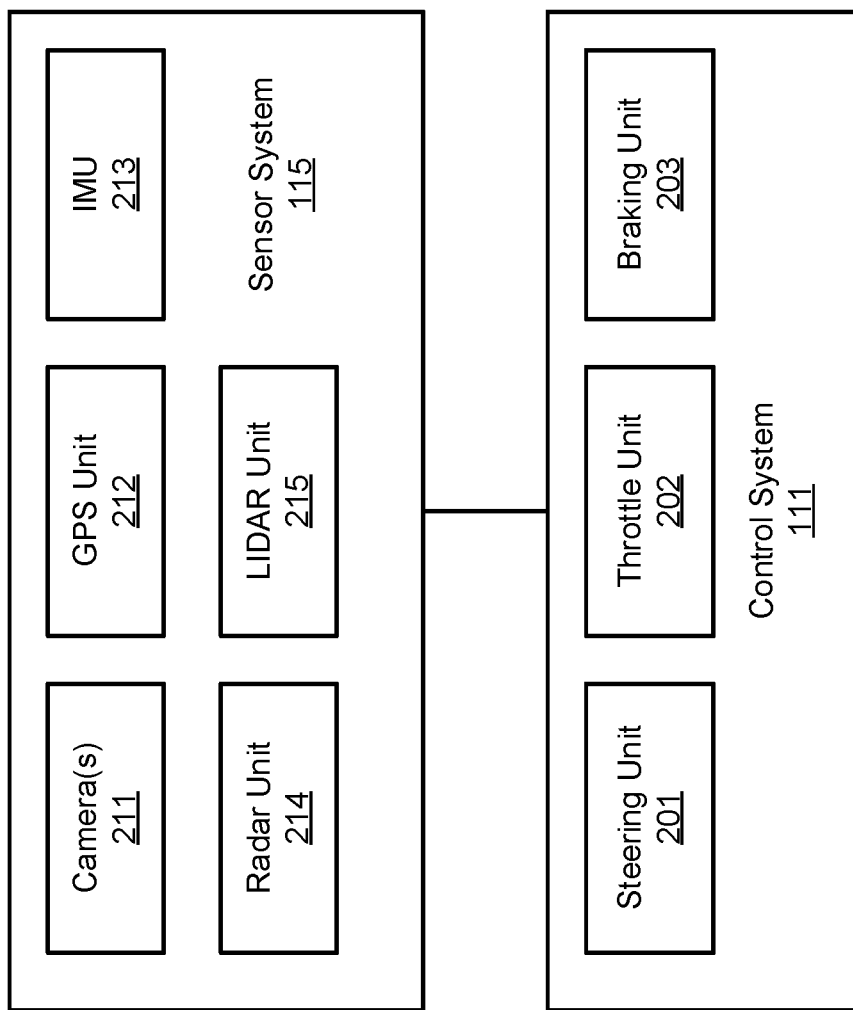
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

Figure 3A:
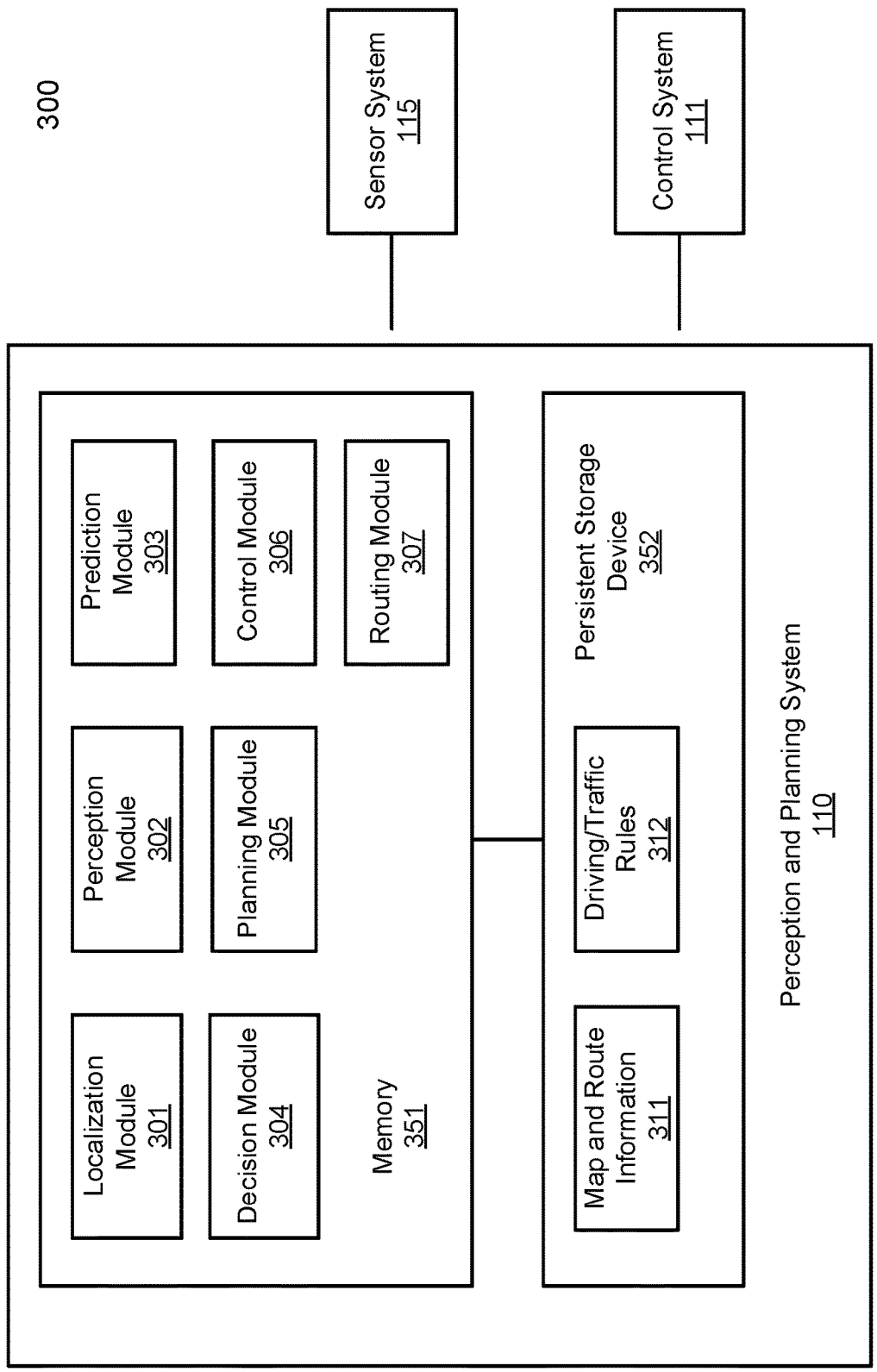
FIGS. 3A-3B are block diagrams illustrating an example of a perception and planning system used with an autonomous vehicle according to one embodiment.
Figure 3B:
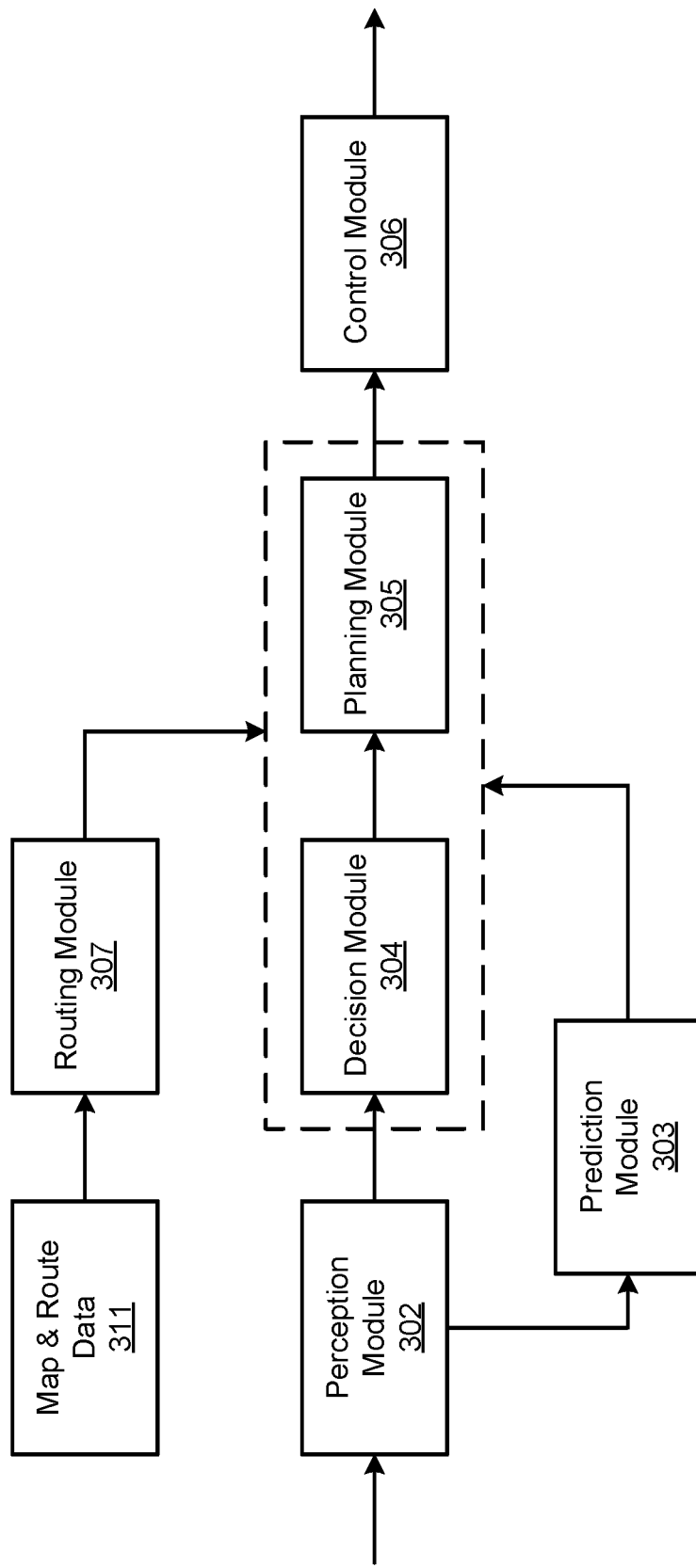

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
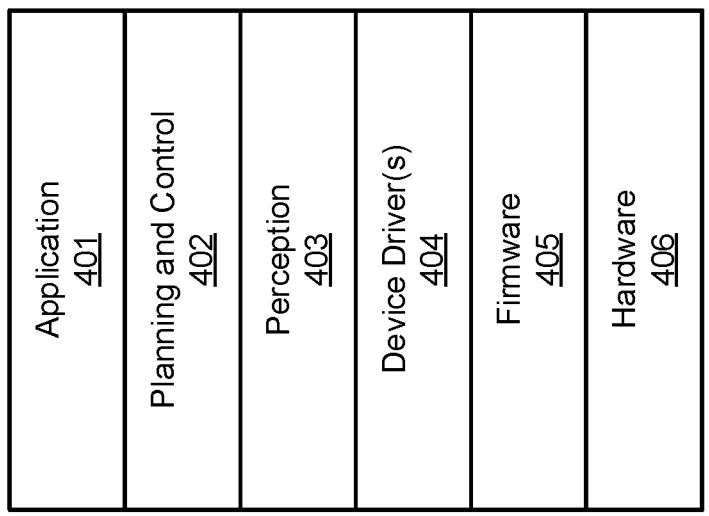
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
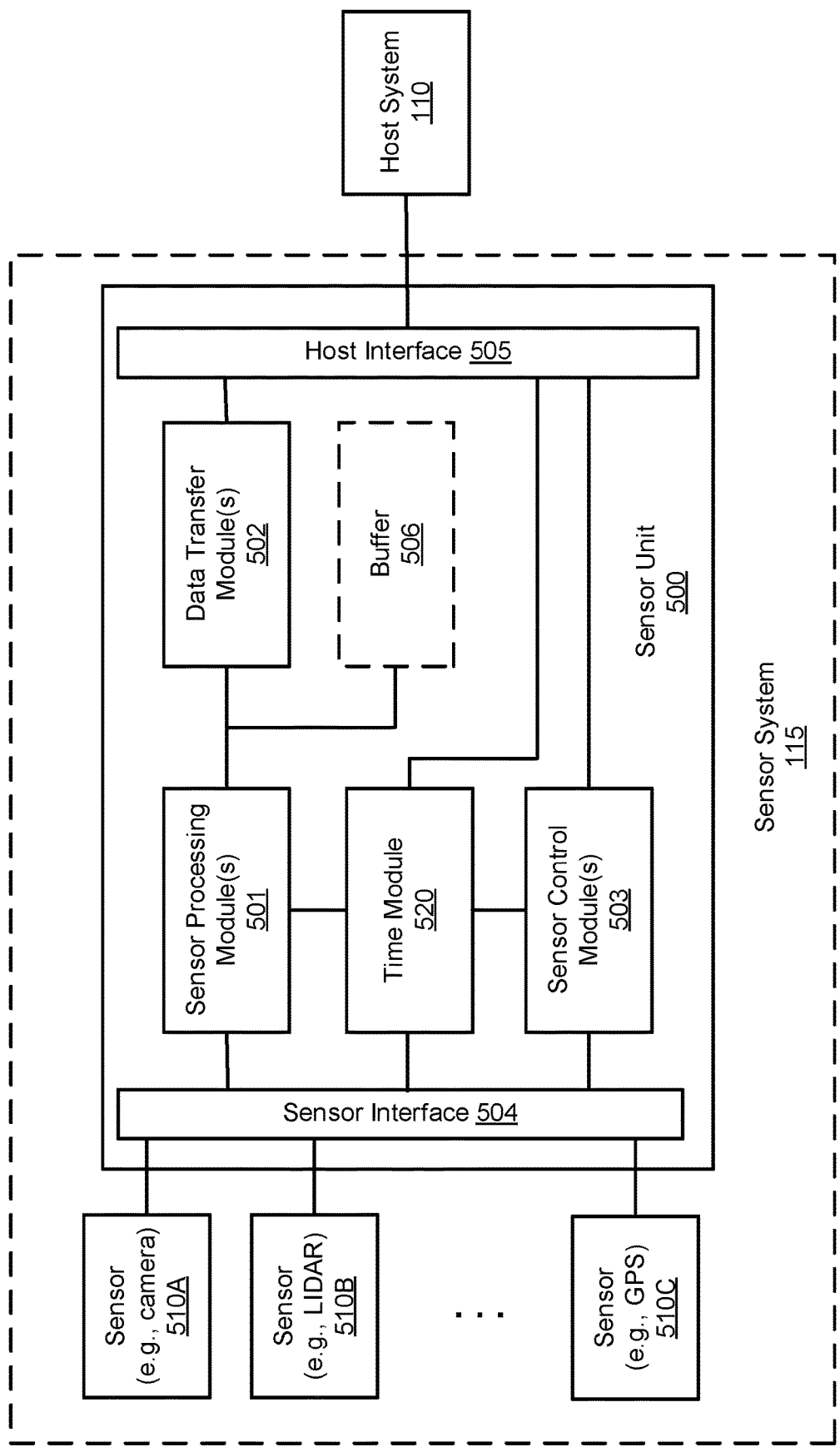
FIGS. 5A and 5B are block diagrams illustrating an example of a sensor unit according to one embodiment.

FIG. 5A is a block diagram illustrating an example of a sensor system according to one embodiment of the invention. Referring to FIG. 5A, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, sensor control modules or logic 503, and time module 520. Modules 501-503 and 520 can communicate with sensors 510A-510C (collectively referred to as sensors 510) via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

In one embodiment, time module 520 is configured to generate timestamps for the sensor processing module 501 and the sensor control module 503, referred to as receiving timestamps and transmitting timestamps. The receiving timestamps are utilized by the sensor processing module 501 to process the sensor data received from the sensors in a controlled timing manner. Similarly, the transmitting timestamps are utilized by the sensor control module 503 to control the sensors in a controlled timing manner. The transmitting timestamps and the receiving timestamps allow the system to synchronize in time the control commands issued to the sensors and the sensor data captured and received from the sensors in response to the control commands. The time module 520 is configured generate time based on GPS signals received from a GPS sensor or pulse per second (PPS) and GPRMC signals received from a GNSS received via the sensor interface. When the GPS or the PPSGPRMC signals are unavailable, the time module 520 is configured to derive time from other time sources (e.g., host system or a remote device over a network).

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
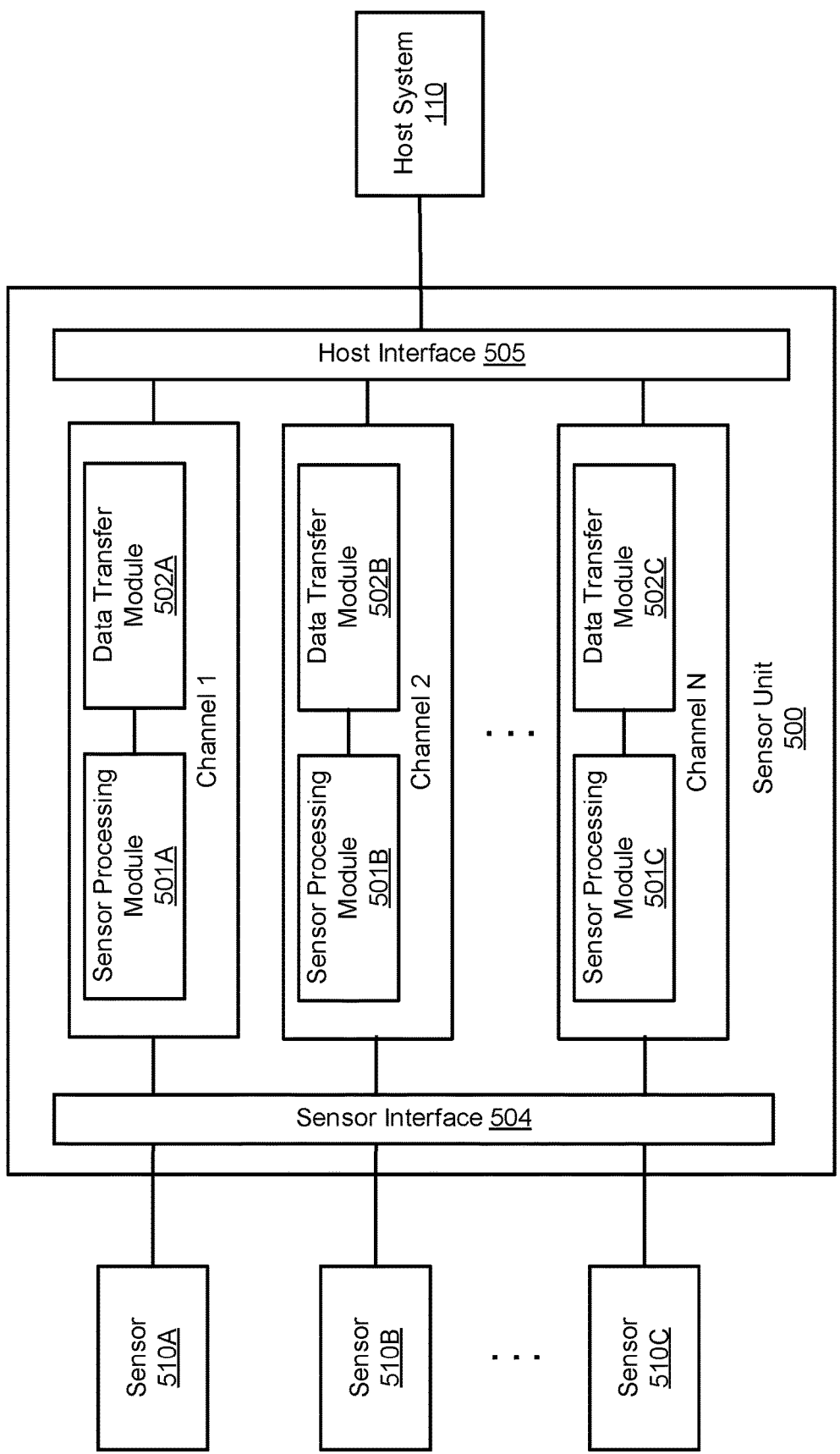

Referring now to FIG. 5B, sensor processing modules 501A-501C are specifically configured to process sensor data obtained from sensors 510A-510C respectively. Note that sensors 510A-510C may the same or different types of sensors. Sensor processing modules 501A-501C can be configured (e.g., software configurable) to handle different sensor processes for different types of sensors. For example, if sensor 510A is a camera, processing module 501A can be figured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 502A-502C can be configured to operate in different modes, as different kinds of sensor data may be in different size or sensitivities that require different speed or timing requirement. According to one embodiment, each of data transfer modules 502A-502C can be configured to operate in one of a low latency mode, a high bandwidth mode, and a memory mode (also referred to as a fixed memory mode).

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

Similarly, each channel may be associated with a specific sensor control module, such as sensor control module 503, which is configured to control or trigger the operations of a corresponding sensor. Time module 520 is coupled to the components of each of the channels to provide time services such as timestamps to a sensor and its corresponding sensor processing module, sensor control module, and/or data transfer module of the channel.

According to one embodiment, each data transfer module includes a transmitting (TX) module and a receiving (RX) module. The TX module is responsible for transmitting data or commands from host system 110 to a sensor. The RX module is responsible for receiving sensor data from a sensor and sending the received sensor data to host system 110. According to one embodiment, in response to a request to send data and/or commands to a sensor, the TX module requests and receives a pointer pointing to a TX descriptor buffer that has been set up by the host system, which may be stored as a part of TX descriptor buffer information. The descriptor buffer information includes metadata describing a TX buffer which has been mapped to a host system memory of host system 110. The mapped memory region is configured to store the data and/or commands to be sent to the sensor. In one embodiment, the TX descriptor includes one or more memory block entries. Each memory block entry includes information specifying a starting address of a memory block and a size of the memory block. The data to be sent may be temporarily stored in buffer 506, where the data can be further processed by a corresponding sensor processing module. Alternatively, the sensor processing module can directly process the data from the mapped host memory via the descriptor buffer.

According to one embodiment, when a signal is received indicating that there are sensor data generated from a sensor and may be processed by a corresponding sensor processing module, the RX module sends a request to host system 110 to request memory pages to be allocated to receive the data generated from the sensor. The RX module then receives RX buffer tables from host system 110. The RX buffer tables may include multiple levels (e.g., N levels) of mapping tables. In one embodiment, the top level buffer table includes an RX page directory table. In one embodiment, the RX page directory table includes one or more page table entries. Each page table entry stores a memory address of a particular page table (e.g., a next level table). Each page table entry includes information specifying a start address of a memory page (e.g., a fixed memory page as a next level table) of the host memory of host system 110. There can be N levels of linked tables between the top level table and the memory pages of the host memory of host system 110. Each parent level table includes an address or link referencing to a child level table in a hierarchical structure.

Figure 6:
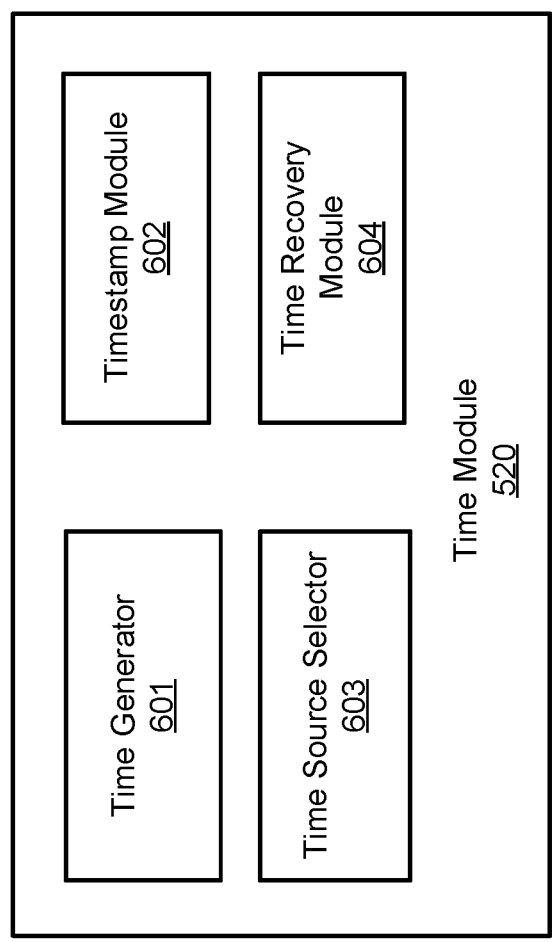
FIG. 6 is a block diagram illustrating an example of a time module according to one embodiment.

FIG. 6 is a block diagram illustrating an example of a time module according to one embodiment. Referring to FIG. 6, time module 520 includes, but it is not limited to, time generator 601, timestamp module 602, time source selector 603, and time recovery module 604. Time generator 601 is configured to generate time based on a time source, where the time can be utilized by other components such as sensor processing modules and sensor control modules. Timestamp module 602 is configured to generate and provide timestamps to other components based on the time provided by time generator 601. When a primary time source is unavailable, time source selector 603 is configured to select an alternative time source to generate the time. When there is no time source available, time recovery module 604 is configured to recover the time when a time source becomes available.

Figure 7:
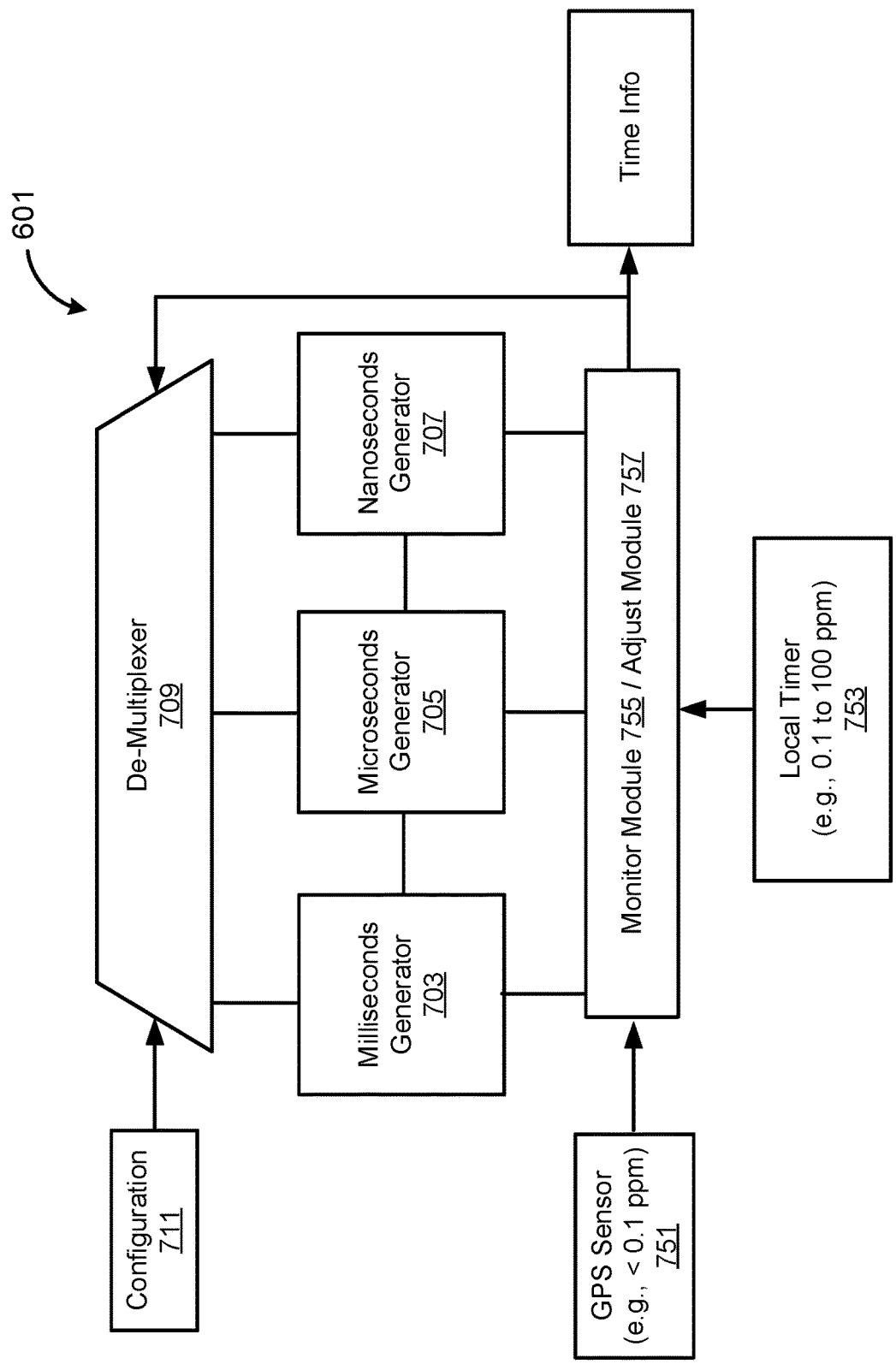
FIG. 7 is a block diagram illustrating an example of a time generator circuit according to one embodiment.

FIG. 7 is a block diagram illustrating an example of a time generator according to one embodiment. Referring to FIG. 7, time generation unit 601 can include monitor module 755, adjust module 757, millisecond generator 703, microsecond generator 705, nanosecond generator 707, de-multiplexer 709, and configuration 711. Millisecond generator 703, microsecond generator 705, and nanosecond generator 707 can generate millisecond, microsecond, and nanosecond oscillation cycles respectively (e.g., oscillator counters at three different granularities) based on an oscillator of local timer 753. Configuration 711 can configure a select signal to select which of the outputs for millisecond generator 703, microsecond generator 705, and nanosecond 707 are to be routed to monitor module 755. Monitor module 755 can monitor the generated oscillation cycles to count these cycles. Adjust module 757 can adjust the counts (or modifies the count representations) so to sync the local timer 753 with a PPS signal from GPS sensor 751. In one embodiment, select signal for configuration 711 can be programmed by a user of sensor unit 500 or by monitor module 755/adjust module 757 in a feedback loop. For example, a user can configure to disable the millisecond generator if it is determined that local timer 753 is relatively precise.

Depending on the type of crystal oscillators used, local timer 753 can have an accuracy ranging from 0.1 to 100 ppm, e.g., any pulse can be off by 0.1 to 100 microseconds, whereas the pulse per second (PPS) signal from GPS sensor 751 has an accuracy rate of less than 0.1 ppm, or less than 0.1 microseconds of deviations for each pulse for each second. For a 0.1 ppm GPS PPS signal, a received PPS signal from GPS sensor 751 can assert consecutive pulses to be between 999,999.9 and 1,000,000.1 microseconds every second, while a typical 100 ppm local timer 753 can assert consecutive pulses to be between 999,900 and 1,000,100 microseconds every second. Furthermore, the variations in deviations of the pulses for local timer 753 can change in real-time due to changes in ambient temperature of the crystal oscillator ICs using by local timer 753. Thus, an objective is to adjust or sync local timer 753 to match GPS sensor 751 in real-time.

To sync local timer 753 to GPS sensor 751, in one embodiment, GPS sensor 751 receives a GPS pulse signal (PPS) that is a RF signal transmitted by a satellite broadcasting its signal in space with a certain accuracy rate, e.g., <0.1 ppm. In some embodiments, GPS sensor 751 receives the PPS signal from a first GPS satellite followed by a PPS signal from a second GPS satellite if the first GPS satellite is out of range. Because GPS satellites use its own precise measure of time with each satellite having its own on-board set of atomic clocks, PPS signals from the GPS satellites can be viewed as one or more reference timers. Note, however, because local timer 753 is adjusted in real-time to match any one GPS PPS signal, it is assumed that any time discrepancies when GPS PPS signals of two or more different GPS satellites are not a concern since the local timer 753 can be synced smoothly in real-time, as described further below.

Once a GPS PPS signal is received, monitor module 755 can determine any offsets of a time of the PPS signal and a time for local timer 753 and can generate a second local real-time clock/timer based on the determined offsets. For example, based on the PPS signal, date and time information (Coordinated Universal Time or UTC format) can initially be provided by GPS (National Marine Electronics Association) NMEA data information, accurate up to the seconds. Next, in one embodiment, milliseconds generator 703 can generate a close-to-one-millisecond oscillation count (e.g., a first granularity) using local timer 753. The close-to-one-millisecond oscillation count can be generated using a frequency divider circuit to divide a signal frequency of the local timer 753. Monitor module 755 may then detect or count a number of cycles (e.g., 999 cycles) from milliseconds generator 703 for a GPS PPS signal time interval of one second, e.g., local timer 753 lags the GPS PPS signal by about one millisecond. Because milliseconds generator 703 lags the GPS PPS, in one embodiment, adjust module 757 adjusts the milliseconds generator output to represent 1.001 milliseconds per oscillation. Milliseconds generator 703 then generates the following 1000 oscillation representations for each second: 0.000, 1.001, 2.002, . . . , 999.999, and 1001 milliseconds. So the 999$^{th}$ cycle from milliseconds generator 703 counts to 999.999 milliseconds.

Next, microseconds generator 705 can generate a close-to-one-microsecond oscillation count using local timer 753. The close-to-one-microsecond oscillation count (e.g., a second granularity) can be generated using a second frequency divider circuit to divide a signal frequency of the local timer 753. Monitor module 755 may count 998 cycles from microseconds generator 705 or a 2 microseconds offset for a GPS PPS time interval of one millisecond. Again, because microseconds generator 605 lags the GPS PPS, adjust module 757 adjusts the microseconds generator output to represent 1.002 microseconds per oscillation. The microseconds generator then generates the following 1000 oscillation representations for each millisecond: 0.000, 1.002, 2.004, . . . , 999.996, 1000.998, and 1002 microseconds. So the 998$^{th}$ cycle counts to 999.996 microseconds.

Next, nanoseconds generator 707 can generate a close-to-one-nanosecond oscillation count using local timer 753. The close-to-one-nanosecond oscillation count (e.g., a third granularity) can be generated using a third frequency divider circuit to divide a signal frequency of the local timer 753. Monitor module 755 may count 997 cycles from nanoseconds generator 707 or detect a 3 nanoseconds offset for a GPS PPS signal time interval of one microsecond. Again, adjust module 757 can adjust the nanoseconds generator output to represent 1.003 nanosecond per oscillation. The nanoseconds generator then generates the following 1000 oscillation representations for each microsecond: 0.000, 1.003, 2.006, . . . , 999.991, 1000.994, 1001.997, and 1003 nanoseconds. So the 997$^{th}$ cycle from the nanoseconds generator 607 counts to 999.991 nanoseconds. This way, any of the generator outputs (e.g., representations) or a combination thereof, can generate a high precision time in real-time. The high precision time can then be provided to the sensors of sensor unit 500. In the above example, the generated time has a precision up to one nanosecond using the nanoseconds generator. Note, although three generators (e.g., three granularities) are described, any number of generators and granularities can be used to generate a high precision time.

In some embodiment, configuration 711 can selectively enable/disable, via de-multiplexer 709, any of generators 703-707. The selectivity can turn on/off any of the generators. Selectivity is useful to select a subset of the generator outputs (e.g., only nanosecond generator) when only a subset of the outputs is required. In another embodiment, monitor module 755 buffers (e.g., saves) the offsets for the different granularities and maintaining the first, second, and third count values (e.g., value representations per oscillation) if a GPS sensor signal is lost, until the GPS sensor signal is again regained.

Figure 8:
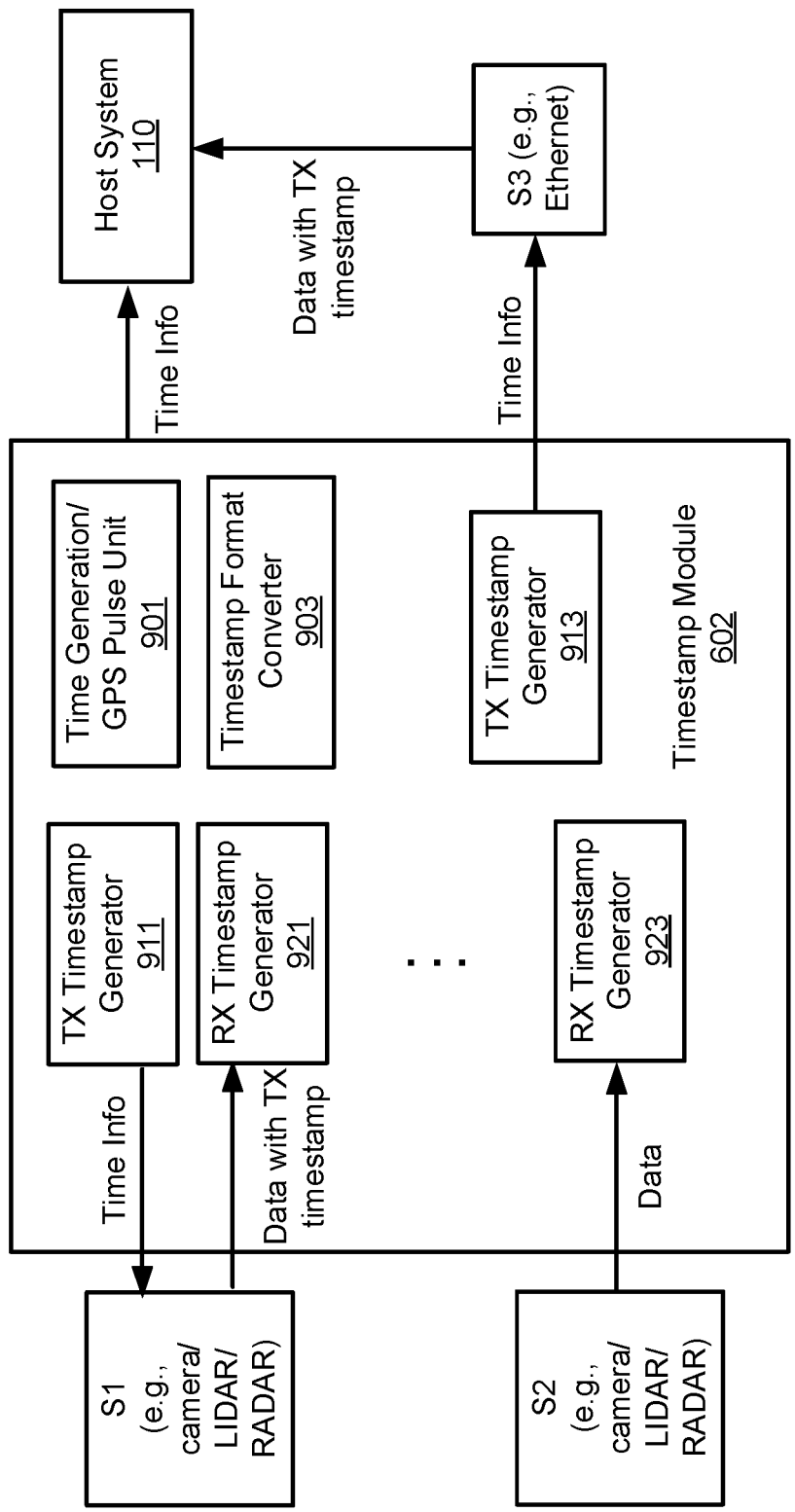
FIG. 8 is a block diagram illustrating an example of a timestamp module according to one embodiment.

FIG. 8 is a block diagram illustrating an example of a timestamp module according to one embodiment. Referring to FIG. 8, timestamp module 602, also referred to as a timestamp sync hub device, includes time generation or GPS pulse unit 901, timestamp format converters 903, TX timestamp generators 911-913 and RX timestamp generators 921-923. Note that some or all of these modules or components can be integrated into fewer numbers of modules. Timestamp sync hub device 602 is coupled to a number of sensors (e.g., S1, S2, and S3) to provide TX/RX and/or trigger timestamps for the sensors. Time generation or GPS pulse unit 901 can generate a time or provide a GPS pulse for the sensors S1-S3. Timestamp format converter 903 can convert one timestamp format to another, for example, a timestamp may be converted from a format of ms:us:ns: mm:ss:hh:month:day:year to a format mm:ss:hh:month:day: year. The timestamp format can include year, month, day, hour, minutes, seconds, milliseconds, microseconds, and nanoseconds in any combination and/or ordering. Timestamp format converter 903 can thus convert one format to another as required by time input parameters of some sensors, such as sensors S1 and S3.

TX timestamp generators 911-913 can generate a transmit timestamp for sensors of the sensor unit. In one embodiment, TX timestamp generator can simply route the GPS PPS to one or more sensors to provide a GPS PPS signal to the sensors (e.g., S1). Examples of a S1 sensor include Velodyne's LIDAR sensors which accept a GPS time information as an input. The GPS time input information is used to sync the LIDAR sensor to a GPS clock. After the sensor is synced, the LIDAR sensors can trigger/capture a depth image and include a trigger timestamp with the depth image. A second timestamp may be a transmit timestamp which represent a time when sensor S1 transmits sensor data from S1 to sensor unit 500. Here, the trigger timestamp and/or the transmit timestamp may be sent as metadata with the depth image from sensor S1 to sensor unit 500.

Another example of a S1 sensor includes a camera sensor which may accept a mm:ss:hh:month:day:year formatted time information as an input parameter. In this case, TX timestamp generator generates a mm:ss:hh:month:day:year format TX timestamp (as provided by time generation unit 901) to be sent to the camera sensor. The camera sensor can trigger/capture a RGB image having a trigger timestamp which can be derived from the TX timestamp (e.g., accounting for any in between delays). A second timestamp (transmit timestamp) representing when the sensor data is transmitted to sensor unit may be include with the trigger timestamp, as time information metadata. The sensor data along with the time information metadata can then be transmitted from camera sensor to sensor unit 500. Other examples of S1 sensors include RADAR sensors, SONAR sensors, and any sensors that accept a time input parameter.

In another embodiment, TX timestamp generator generates a timestamp in the mm:ss:hh:month:day:year format and provide the generated timestamp for one or more sensors, the mm:ss:hh:month:day:year timestamp having been synchronized with a GPS PPS signal. These sensors (e.g., S3) may transmit sensor data and timestamp metadata (unaltered) directly to host system 110. A direct coupling to host system 110 may be established when no more communication channels are available or when the sensor data only requires a low bandwidth, such as an Ethernet connection. Examples of S3 sensors can include Ethernet, camera and/or RADAR sensors, etc.

RX timestamp generators 921-923 can generate a receive timestamp at the time when sensor unit 500 receives the sensor data and to add the generated receive timestamp as time metadata to the sensor data. So when the sensor data are sent to host system 110, there is available information about a time when sensor unit 500 acquired the sensor data. Examples of sensors that use RX timestamp generators are S1 and S2. The difference between S1 and S2 is that S1 also provides transmit (TX) and/or trigger timestamp information, whereas S2 provides only receive (RX) timestamp information. Examples of S2 sensors include LIDAR, camera and/or RADAR sensors, etc.

In another embodiment, timestamp sync hub device 602 is coupled to host system 110 (e.g., through PCIe bus) to provide a time information (e.g., time information/timestamps 313) to host system 110. The provided time information allows host system 110 to sync an RTC (e.g., CPU-RTC) of host system 110 to the provided time such that a single global time is used among sensor unit 500 and host system 110. Thereafter a planning and control module of host system 110 for the ADV can plan and control the ADV autonomously using a local RTC of host system 110 which is synced to sensor unit 500.

Figure 9:
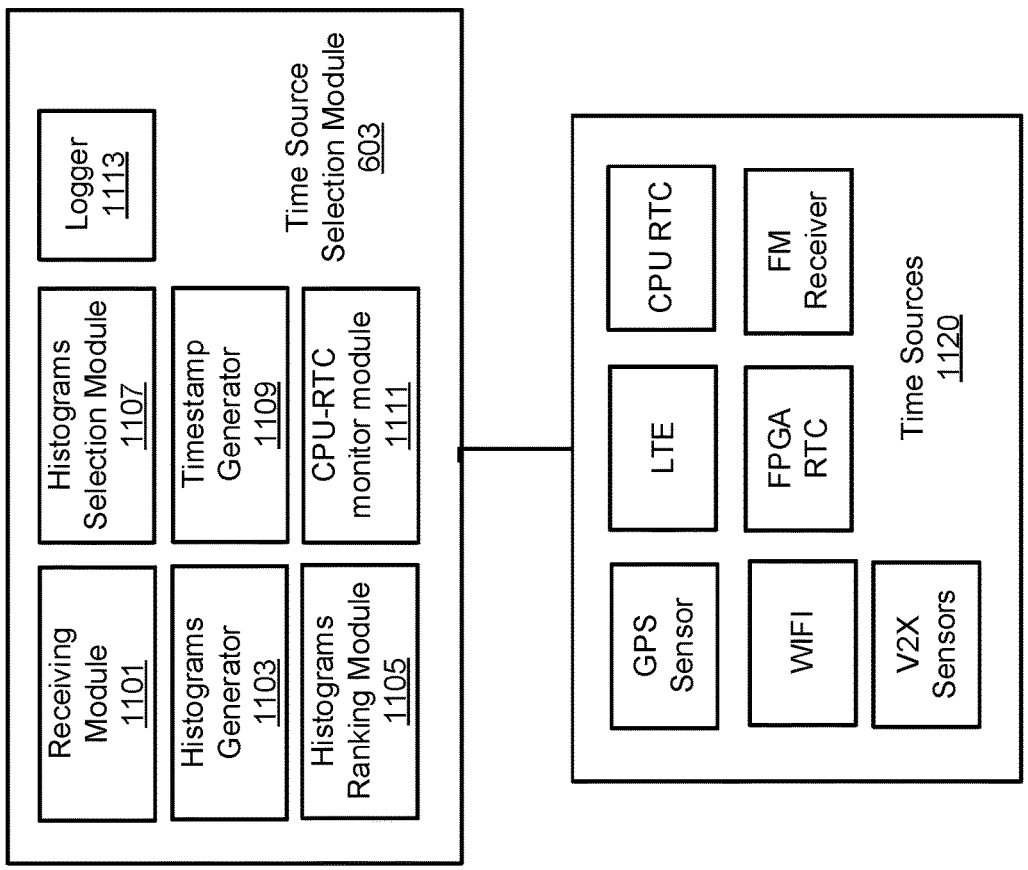
FIG. 9 is a block diagram illustrating an example of a time source selection module according to one embodiment.

FIG. 9 is a block diagram illustrating an example of a time source selection or ranking circuit according to one embodiment. Referring to FIG. 9, time source selection module 603 can include sub-modules such as receiving module 1101, histograms generator 1103, histograms ranking module 1105, histograms selection module 1107, timestamp generator 1109, CPU-RTC monitor module 1111, and logger 1113. Time sources 1120 may include GPS sensor, LTE, CPU RTC, WIFI, FPGA RTC, FM receiver, and V2X sensors.

Receiving module 1101 can receive timestamps or time information from the different time sources 1120. Histograms generator 1103 can generate a difference histogram based on the received timestamps or time information from the different time sources 1120. In one embodiment, the difference histogram can be a difference histogram averaged over a period of time, e.g., a few hours or a day. In another embodiment, the difference histogram averaged over a period of time can be a running average. Histograms ranking module 1105 can rank the time sources using the GPS sensor time source as a reference time source, e.g., the time source is ranked from least to greatest time differences in comparison to a time of the GPS sensor. Histograms selection module 1107 can select a time source with a time with the least difference to a time of the GPS sensor time source. Timestamp generator 1109 can generate time information or timestamps based on the selected time source. CPU-RTC monitor module 1111 can monitor a time different of a time for the CPU-RTC and the GPS sensor. Logger 1113 can store time information of the CPU-RTC to a log file such as a delta time or time difference of a time for the CPU-RTC and the GPS sensor.

Time source ranking module 603 is used by an ADV when the ADV ignition is turned on in an underground parking garage (e.g., when there is no GPS signal). In one embodiment, because sensor unit 500 or host system 110 still requires a relatively accurate time to generate timestamps, if there lacks information about accuracies of available time sources of sensor unit 500 or the ADV, a default ranking list of time sources can be used to determine a preferred time source. An example of a default ranking list can rank various time sources in an order such as: GPS, FPGA RTC, WIFI, LTE, and CPU RTC. In this case, if the only available time sources are from an FPGA RTC and a WIFI signal, the FPGA RTC time source has priority and is the preferred time source to establish a local time, such as a local time of local timer 753 of FIG. 7. However, as soon as a signal from a GPS sensor is available, in one embodiment, time source ranking module 603 determines accuracy of the different available time sources based on a ranking system.

In one embodiment, time source ranking module 603 generates a histogram based on the absolute difference values of the many available time sources, by a ranking system. The histograms or difference histograms may be generated for a few rounds, or these histograms can be averaged over a predetermined period of time, or as long as the GPS signal is available. The closest time source (e.g., least difference) to the GPS sensor as determined by the difference histogram is selected as the best time source to be used when the GPS signal is unavailable, e.g., the next time the ADV starts ignition in an underground garage. In one embodiment, a CPU RTC is preconfigured to be the preferred time source. In this case, a difference histogram, a delta time, or an average delta time for the CPU RTC is written to a log file or a log buffer by logger 1113. The difference histogram, a delta time, or an average delta time records a time difference for the CPU RTC and the GPS time. At the next ignition, without a GPS signal, sensor unit 500 can then adjusts the CPU RTC based on the delta time and uses the adjusted CPU RTC as the local time. In one embodiment, when the GPS signal is available, the delta time can be updated to reflect any deviations of the CPU RTC.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
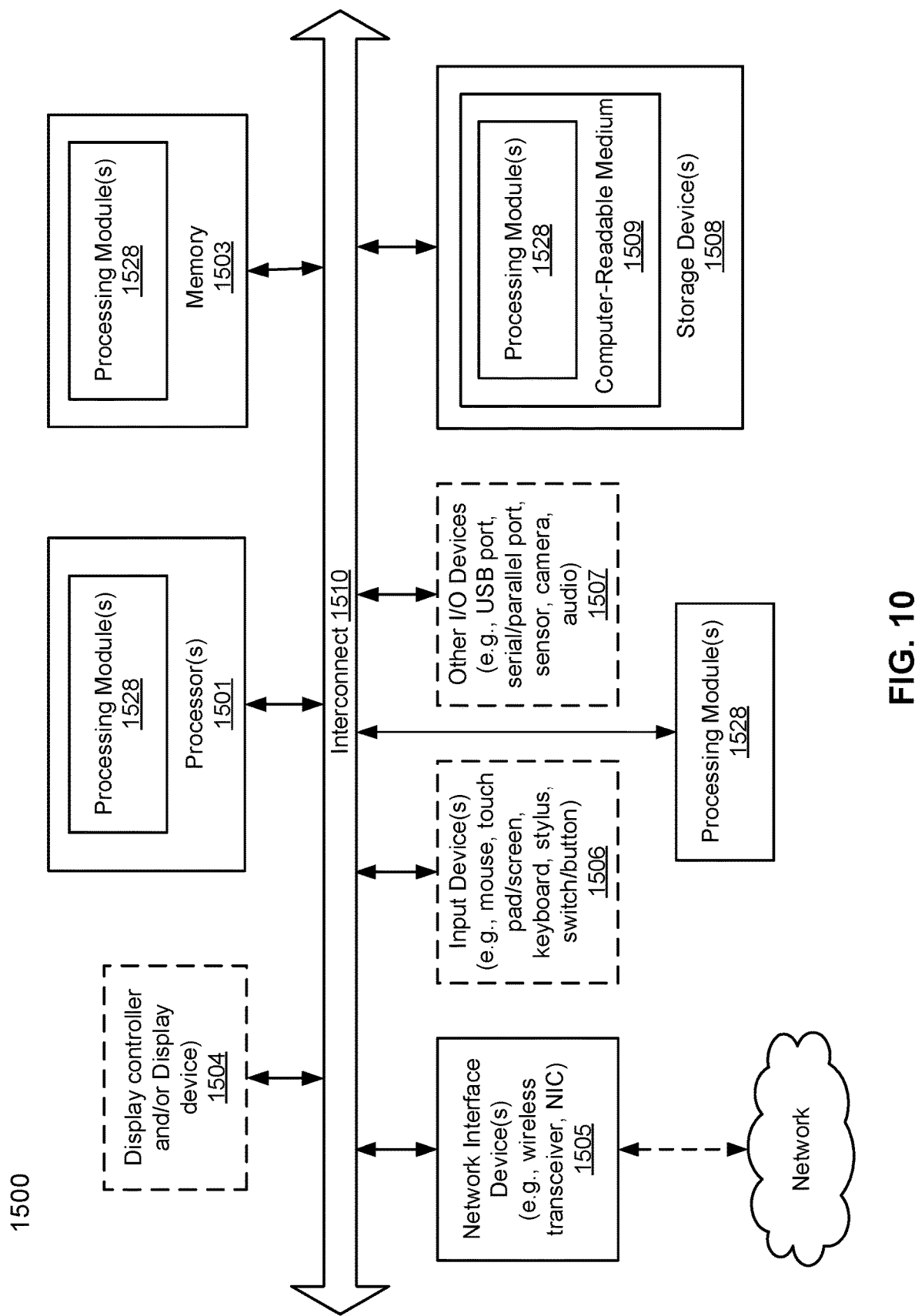
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein.

Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, perception module 302, planning module 305, control module 306, and/or sensor unit 500. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A sensor unit utilized in an autonomous driving vehicle, the sensor unit comprising:
   a sensor interface to be coupled to a plurality of sensors mounted on a plurality of locations of an autonomous driving vehicle (ADV);
   a host interface to be coupled to a host system, wherein the host system is configured to perceive a driving environment surrounding the ADV based on sensor data obtained from the plurality of sensors and to plan a path to autonomously drive the ADV;
   a sensor control module coupled to the sensor interface, the sensor control module configured to control activation of capture of sensor data for each sensor in the plurality of sensors in accordance with a transmit timestamp for the sensor, the transmit timestamp received from a time module;
   a sensor processing module coupled to the sensor interface, the sensor processing module configured to process sensor data captured by each sensor in the plurality of sensors in accordance with a receive timestamp for the sensor, the receive timestamp received from the time module; and
   the time module coupled to the sensor processing module and the sensor control module to generate the transmit timestamps to synchronize timing of transmission of control commands to each of the plurality of sensors, wherein the transmit timestamps indicate an ordering and a timing that sensor data is captured by each sensor in the plurality of sensors, and to generate receive timestamps to synchronize the timing that the sensor data captured by each sensor in the plurality of sensors is processed, wherein the receive timestamps indicate an ordering and a timing that the sensor data of each sensor in the plurality of sensors is processed.

2. The sensor unit of claim 1, wherein the host system has to go through the sensor unit in order to access any of the plurality of sensors mounted on the ADV.

3. The sensor unit of claim 1, wherein the time module is configured to generate receiving timestamps for the sensor processing module and to generate transmitting timestamps for the sensor control module from an identical time source.

4. The sensor unit of claim 1, wherein the sensor control module is further configured to generate and send a same transmit timestamp to at least two sensors of the plurality of sensors, indicating that the at least two sensors are to be activated to capture sensor data at a same time indicated in the same transmit timestamp.

5. The sensor unit of claim 4, wherein the at least two sensors are a same sensor type, and the sensor type is LIDAR.

6. The sensor unit of claim 1, wherein the time module is configured to generate the time based on GPS signals received from a GPS sensor or pulse per second (PPS) and GPRMC signals received from a GNSS receiver via the sensor interface.

7. The sensor unit of claim 6, wherein in response to determining that the GPS, PPS, and GPRMC signals are unavailable, the time module is configured to derive the time for synchronization from an alternative time source.

8. The sensor unit of claim 7, wherein the alternative time source includes a real-time clock (RTC) source provided by the host system from the host interface or a network time source from an Ethernet or LTE.

9. The sensor unit of claim 1, further comprising a data transfer module coupled to the sensor processing module to transfer the processed sensor data to the host system via the host interface.

10. The sensor unit of claim 9, wherein the data transfer module is configured to transfer data between the sensors and the host system in a plurality of operating modes dependent upon a type of the sensors, including a low latency mode, a high bandwidth mode, and a fixed memory mode.

11. The sensor unit of claim 10, wherein when operating in the low latency mode, the data transfer module is configured to transfer data with a minimum delay.

12. The sensor unit of claim 10, wherein when operating in the high bandwidth mode, the data transfer module is configured to accumulate the data up to a predetermined amount, prior to sending the accumulated data in a burst to the host system to maximize a bandwidth of a connection between the data transfer module and the host system.

13. The sensor unit of claim 10, wherein when operating in the fixed memory mode, the data module is configured to directly access a mapped memory of the host system.

14. The sensor unit of claim 9, wherein the connection between the data transfer module and the host system is a peripheral component interconnect express (PCIe) compatible connection.

15. The sensor unit of claim 1, wherein the sensor interface comprises an Ethernet interface to be coupled with a LIDAR device or one or more cameras.

16. The sensor unit of claim 1, wherein the sensor interface comprises a global positioning system (GPS) interface to be coupled to at least one of a GPS receiver and an IMU device.

17. The sensor unit of claim 1, wherein the sensor interface comprises a control area network (CAN) interface to be coupled to throttle control logic, braking control logic, and steering control logic of the ADV.

18. An autonomous driving system, comprising:
   a plurality of sensors mounted on a plurality of locations of an autonomous driving vehicle (ADV);
   a host system having a perception module and a planning and control module, wherein the perception module is to perceive a driving environment surrounding the ADV based on sensor data obtained from the sensors, and wherein the planning and control module is to plan a path to autonomously drive the ADV; and
   a sensor unit coupled to the plurality of sensors and the host system, wherein the sensor unit comprises a sensor interface to be coupled to a plurality of sensors mounted on a plurality of locations of an autonomous driving vehicle (ADV), a host interface to be coupled to a host system, wherein the host system is configured to perceive a driving environment surrounding the ADV based on sensor data obtained from the plurality of sensors and to plan a path to autonomously drive the ADV, a sensor control module coupled to the sensor interface, the sensor control module configured to control activation of capture of sensor data for each sensor in the plurality of sensors in accordance with a transmit timestamp for the sensor, the transmit timestamp received from a time module, a sensor processing module coupled to the sensor interface, the sensor processing module configured to process sensor data captured by each sensor in the plurality of sensors in accordance with a receive timestamp for the sensor, the receive timestamp received from a time module, and the time module coupled to the sensor processing module and the sensor control module to generate transmit timestamps to synchronize timing of transmission of control commands to each of the plurality of sensors, wherein the transmit timestamps indicate and ordering and a timing that sensor data is captured by each sensor in the plurality of sensors, and to generate receive timestamps to synchronize the timing that sensor data captured by each sensor in the plurality of sensors is processed, wherein the receive timestamps indicate an ordering and timing that the sensor data of each sensor in the plurality of sensors is processed.

19. The system of claim 18, wherein the host system has to go through the sensor unit in order to access any of the plurality of sensors mounted on the ADV.

20. The system of claim 18, wherein the time module is configured to generate receiving timestamps for the sensor processing module and to generate transmitting timestamps for the sensor control module from an identical time source.

* * * * *